March 24, 1959 W. A. KNUDSON ET AL 2,878,669
APPARATUS FOR DETERMINING THERMAL CONDUCTANCE AND RESISTANCE
Filed March 18, 1955 3 Sheets-Sheet 1
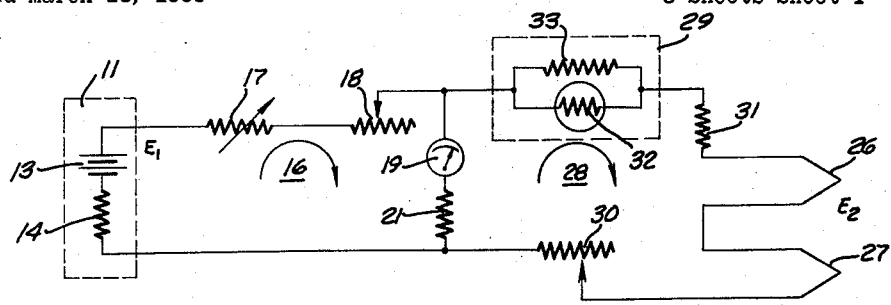
FIG_1
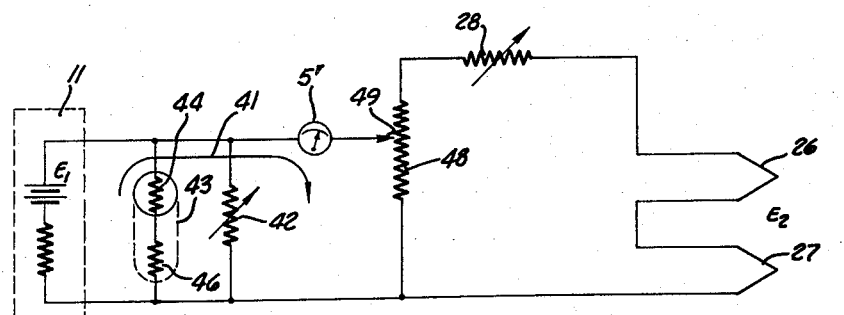
FIG_2
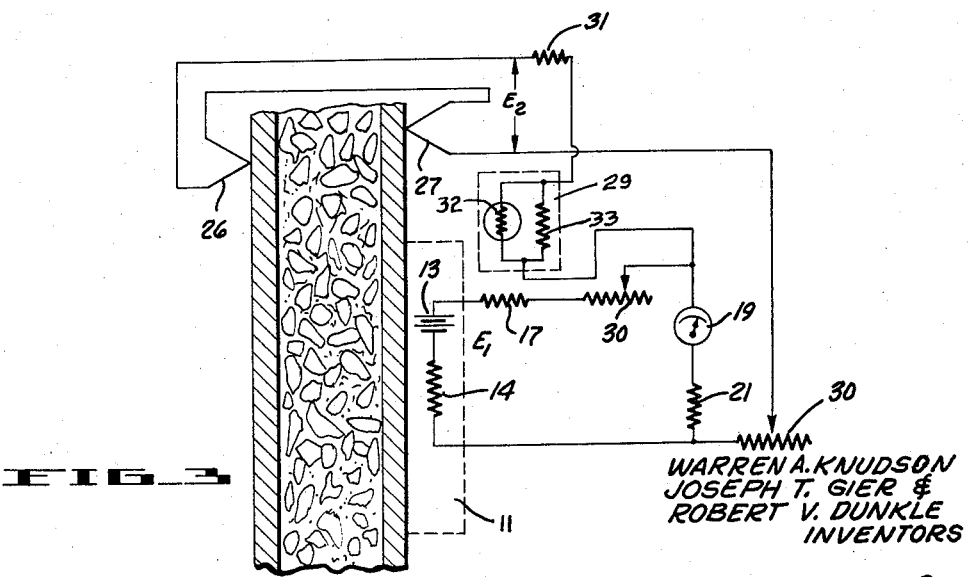
FIG_3
WARREN A. KNUDSON
JOSEPH T. GIER &
ROBERT V. DUNKLE
INVENTORS
BY
ATTORNEYS

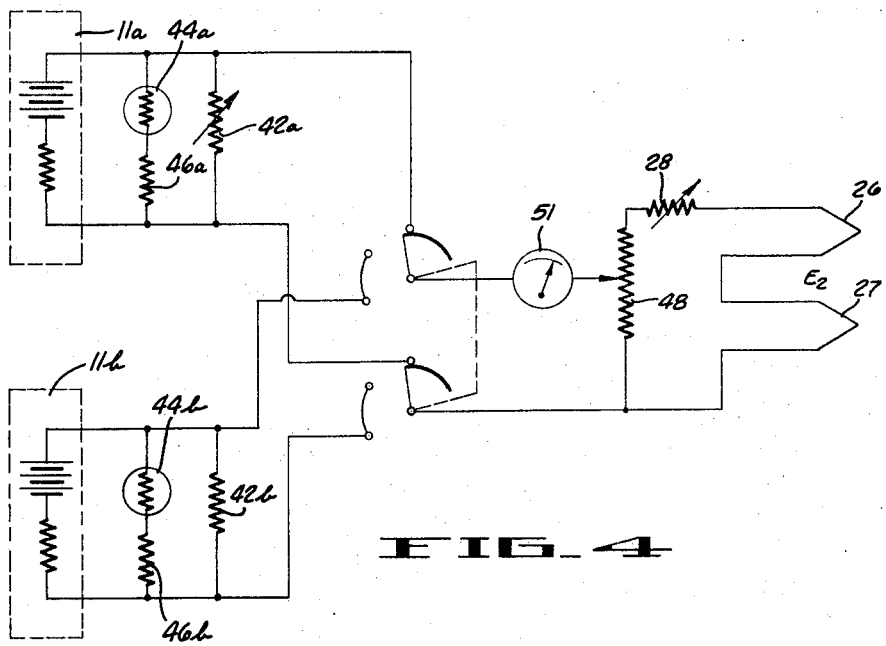
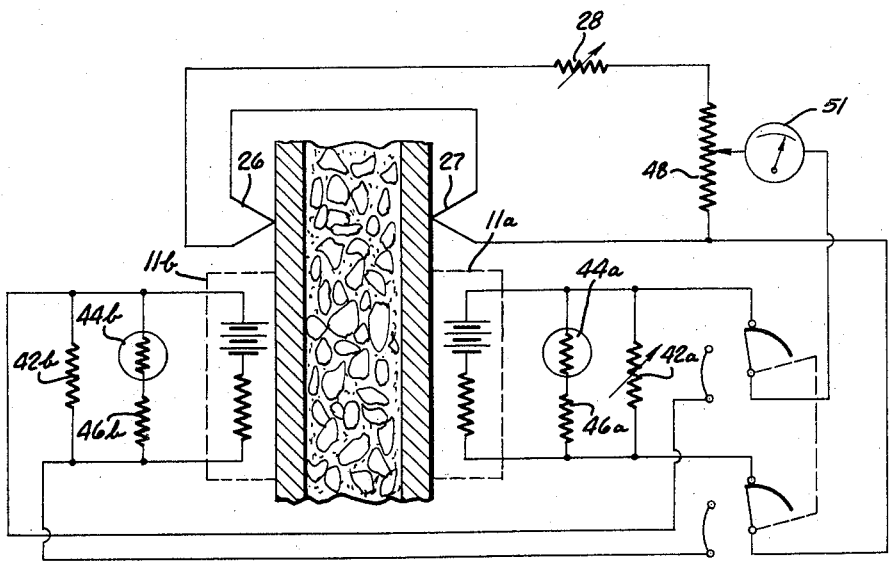

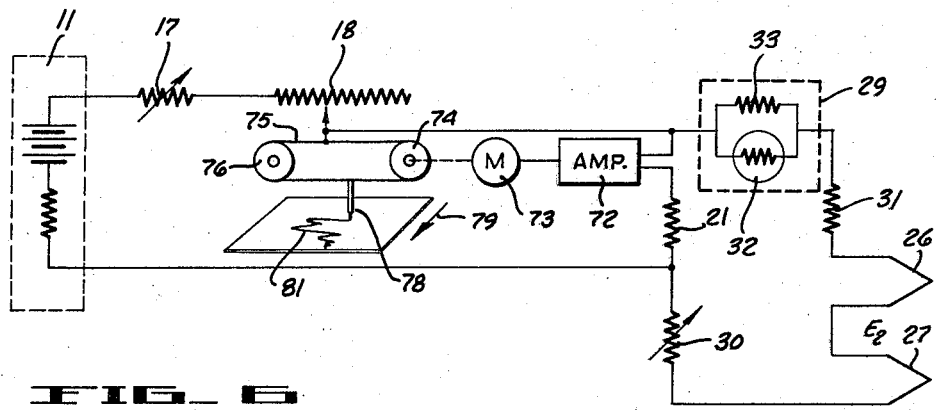
FIG_ 6
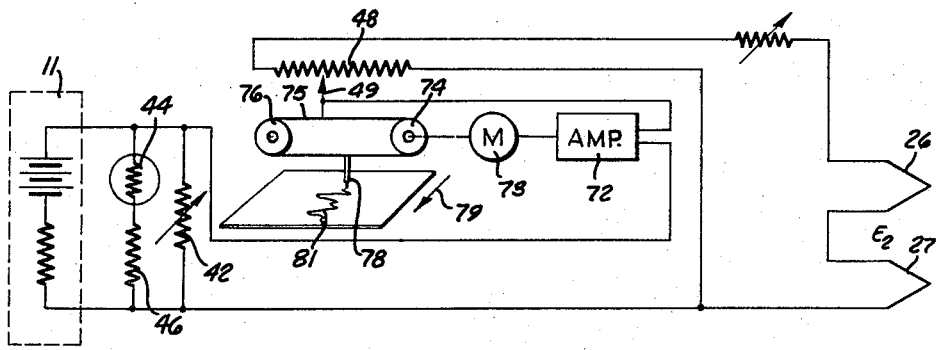
FIG_ 7
WARREN A. KNUDSON
JOSEPH T. GIER &
ROBERT V. DUNKLE
INVENTORS
BY *Flehr & Swain*
ATTORNEYS

United States Patent Office 2,878,669
Patented Mar. 24, 1959

2,878,669

APPARATUS FOR DETERMINING THERMAL CONDUCTANCE AND RESISTANCE

Warren A. Knudson, Chicago, Ill., and Joseph T. Gier, Oakland, and Robert V. Dunkle, Berkeley, Calif.; said Gier and said Dunkle assignors to said Knudson Application March 18, 1955, Serial No. 495,251

11 Claims. (Cl. 73—15)

This invention relates generally to apparatus for determining thermal conductance and resistance.

The thermal conductance (over-all heat transfer coefficient) or thermal resistance are the quantities usually employed by engineers as a measure of the insulating value of a wall. These constants give an indication of the performance of a wall as a barrier to heat flow.

Insulating materials often deteriorate with age due to accumulation of moisture, decay, decomposition, or gradual packing due to vibration. The insulating properties of walls are also greatly affected by the structural members of the wall and the workmanship with which the materials are applied thereto. Very often it is important to know the thermal conductance of a composite wall or other member, the structure of which is unknown.

In the past the thermal conductance and thermal resistance of a composite member such as a wall has been determined by laboratory tests or by calculations. In the latter method the values for the various elements included in the composite structure are obtained from handbooks. The thermal conductance obtained may not have any significance because the materials deteriorate with age. In other instances, it is impossible to calculate the over-all heat transfer coefficient, or to determine this coefficient experimentally since the composition of the wall is unknown.

It is an object of this invention to provide a novel apparatus for determining thermal conductance and thermal resistance.

It is another object of this invention to provide apparatus for determining thermal conductance and resistance which may be used at the site.

It is another object of this invention to provide apparatus for determining thermal conductance and resistance which does not require the construction of a sample for laboratory testing.

It is another object of this invention to provide apparatus for determining thermal conductance and resistance which may be used by laymen.

These and other objects of this invention will appear more clearly from the following description when read in conjunction with the accompanying drawings.

Referring to the drawings:

Figure 1 shows one embodiment of apparatus incorporating our invention;

Figure 2 shows another embodiment of apparatus incorporating our invention;

Figure 3 shows our apparatus as used to determine the thermal conductance of a composite member.

Figure 4 shows an embodiment of apparatus incorporating our invention which includes two thermoelectric heat flow means;

Figure 5 shows the apparatus as Figure 4 as used to determine the thermal conductance of a composite member;

Figure 6 shows an embodiment of the apparatus similar to that of Figure 1 but which includes means for automatically obtaining and recording the thermal conductance and resistance data; and Figure 7 shows an embodiment of the apparatus similar to that of Figure 2 but which includes means for automatically obtaining and recording the thermal conductance and resistance data.

Referring to Figure 1, thermoelectric heat flow means 11 generates a voltage which is proportional to heat flow. Heat flow means of this type have been constructed in many forms by individuals interested in the problem of measuring heat transfer rates. Basically, means of this type measure the temperature drop across a member which offers a resistance to heat flow. The temperature drop is dependent upon heat flow. The means for measuring the temperature drop may comprise thermopiles having junctions on either side of the member. The procedure is analogous to measuring current by measuring the voltage drop across a calibrated shunt. In one embodiment we employed a meter which comprised a Bakelite core with a silver plated constantan thermopile. Heat flow through the meter resulted in a temperature difference between the hot and cold junctions of the thermopile, thus providing a voltage which was proportional to the rate of heat flow. A calibration constant related the heat flow to voltage. Heat flow means of this type are described in Patent No. 2,493,651. The voltage 13 represents the voltage generated by the thermoelectric heat flow means and the resistance 14 corresponds to its internal resistance.

The heat flow means 11 forms a part of the closed loop 16. The loop comprises trimming resistor 17, calibrated variable resistor 18, the balancing meter 19 and the meter resistance 21. The meter 19 may be a galvanometer having suitable sensitivity. Thermoelectric temperature means 26 and 27 each generate a voltage which is proportional to their respective temperatures. These means are connected in opposition to thereby generate a voltage which is proportional to their temperature difference. Other temperature means which provide a suitable output voltage may be employed. For example, resistance thermometers connected in a bridge circuit may be employed to produce a voltage which is proportional to the temperature difference. The temperature means 26 and 27 are connected in a closed loop 28. This loop comprises the temperature compensation means 29, the balancing meter 19, meter resistance 21, trimming resistor 30, and the internal resistance of the temperature means 26 and 27 lumped at 31. The compensating means 29 comprises a resistance which has a negative temperature characteristic. The compensating means 29 corrects for changes in voltage output of the heat flow means 11, with changes in ambient temperature. The compensating means 29 may, for example, include a thermistor 32 which has a negative temperature characteristic connected in parallel with a fixed resistor 33. It is to be understood that temperature compensation may be achieved by employing means having positive temperature characteristics, if such means are appropriately connected in the circuit.

Operation of our device may be more clearly understood from the following analysis: The heat flow through a composite member per unit area is given by the following equation:

$$q/A = U(t_1 - t_2)$$

where $q$ is heat flow, $A$ is area, $U$ is the thermal conductance or over-all heat transfer coefficient, $t_1$ is the air temperature at one surface of the composite member and $t_2$ is the air temperature at the other surface of the composite member.

The heat flow through the composite member may also be expressed as $$q/A = KFE_1$$

where $K$ is the calibration constant of the heat flow means 11, $F$ is temperature correction factor for the heat flow means 11, and $E_1$ is the voltage generated by the heat flow means 11.

The voltage appearing between the temperature means may be expressed as $$E_2 = e(t_1 - t_2)$$

where $e$ is the voltage generated per degree temperature difference.

These equations may be combined to give the over-all heat transfer coefficient. Thus, the thermal conductance may be expressed as $$U = eKFE_1/E_2$$

If means are included in the circuit for temperature compensation, then F is a constant and the thermal conductance is $$U = K'E_1/E_2$$

If the current through the galvanometer is equal to zero, then the current in loop 16 is equal to the current in the loop 28 and $$E_1 = R_1 I$$
$$E_2 = R_2 I$$

where $R_1$ and $R_2$ represent the resistance of loops 16 and 28 respectively, and $$E_1/E_2 = R_1/R_2$$

Thus $$U = K' R_1/R_2$$

and $$R = 1/U = K'' R_2/R_1$$

where R is equal to the thermal resistance.

Thus, by proper selection of the values of resistances which form the loops 16 and 28 and fixing the value of $R_2$, the variable resistance $R_{18}$ may be calibrated to give the thermal conductance (over-all heat transfer coefficient) and the thermal resistance directly, when the current flowing through the meter is reduced to zero.

Operation of the apparatus to obtain the thermal conductance is clearly illustrated in Figure 3. The heat flow means 11 is shown placed against one surface on a composite member. The temperature compensating means 32 is placed adjacent the means 11, and the temperature means 26 and 27 are placed adjacent opposite sides of the composite member. For measuring over-all conductance and resistance of a member, the temperature measuring means are mounted in the air on the two sides of the wall. If the conductivity of the member itself is desired, the temperature means are mounted directly on the wall surface. The variable resistor is adjusted until the balancing meter reads zero. The thermal conductance and thermal resistance are obtained directly from the position of the calibrated resistance.

Apparatus was constructed as shown in Figure 1 in which the resistance 14 equaled 900 ohms, resistance 17 equaled 100 ohms, resistance 21 equaled 900 ohms, resistance 18 was variable between 0 and 20,000 ohms, resistor 33 equaled 1,150 ohms, resistor 32 was a thermistor mounted on the wall and known by manufacturer's specification as Western Electric type 7A, resistance 30 plus 31 equaled 4,450 ohms, the meter was a Leeds and Northrup type E, model 2430–C galvanometer, and the thermoelectric means for indicating temperature were iron-constantan thermocouples. The thermoelectric means for generating a voltage proportional to heat flow was of the type described in Patent No. 2,493,651.

The apparatus constructed with the constants given above was employed to determine the thermal conductance of various composite members. The values obtained agreed favorably with the values calculated from handbooks and values determined experimentally.

Referring to Figure 2, we have shown another embodiment of our invention which includes a thermoelectric heat flow means 11 for generating a voltage which is proportional to heat flow connected in a loop 41 which includes the resistor 42 and temperature compensating means 43 connected in parallel. The temperature compensating means comprises a resistance having a negative temperature characteristic, for example a thermistor 44, connected in series with a fixed resistor 46 to provide adjustment of the compensation. As previously described, the temperature compensating means may include a resistance having a positive temperature characteristic. The thermoelectric temperature means 26 and 27 with their internal resistance 28 are connected in a circuit which includes the resistor 48 provided with an adjustable tap 49. The indicating means 51 has one side connected to the adjustable tap 49 and its other side connected to one side of the resistor 42. The other side of the resistor 42 and one side of the resistor 48 are common. Thus the indicating means 51 has a predetermined fraction of the voltage $E_1$ connected to its other side. By adjusting the tap 49, these voltages may be made equal. Thus it is seen that a predetermined fixed fraction of voltage $E_1$ is compared to a variable fraction of the voltage $E_2$ and that the fraction of the voltage $E_2$ determines the over-all heat transfer coefficient. Since the latter fraction depends upon the setting of the variable tap 49, the tap position may then be calibrated to give thermal conductance and thermal resistance directly.

It is important, when determining the thermal conductance and thermal resistance, to make sure that a steady state exists when a reading is taken. Thus, reading should be taken only when conditions have been stable long enough to approach a steady state. The greater the thermal capacity and resistance of the wall, the longer period of time this will take. By employing two heat meters, one placed on each side of the wall, it is possible to rapidly determine when a steady state exists.

Referring to Figure 4, we have shown thermal conductance and resistance apparatus of the type shown in Figure 2 which includes two thermoelectric heat flow means 11a and 11b of the type previously described. The heat flow means 11a and 11b, together with their associated circuitry which was previously described, are connected to the meter 51 and the calibrated resistance 48 through a suitable switch 61. When the switch is placed in position $a$, heat meter 11a is placed in the circuit and the thermal conductance obtained will correspond to the heat flow through the side of the member on which the heat flow means 11a is placed. When the switch is switched to connect the points $a$ and $b$, the voltage developed by the two heat flow means is in parallel and applied to the circuit. Thus, an average of the heat flow on the two sides of the wall is obtained. When the switch is in position $c$, the heat flow means 11b is connected in the associated circuit and thus the heat flow on the other surface of the wall is measured and the corresponding electrical voltage applied to the meter means. If the values for thermal conductance and resistance obtained when in positions $a$ and $c$ are equal, then steady state conditions have been reached. If steady state or equilibrium conditions are not reached and the switch is switched to connect the two heat flow means in parallel, an average voltage will be developed which will give results which will be nearer the correct value of thermal conductance and thermal resistance than that obtained with either heat flow means alone. In Figure 5, we have shown a meter of the type illustrated in Figure 4 applied to measure the thermal conductance and thermal resistance of a member. It should be understood, of course, that the apparatus shown in Figure 1 may be modified as described with reference to Figure 4 to employ two thermoelectric heat flow means 11 to give results similar to those described above.

In Figures 6 and 7 we have shown apparatus similar to that of Figures 1 and 2 but which includes means for continuously and automatically measuring the thermal conductance and thermal resistance. The apparatus shown in Figures 6 and 7 may also incorporate means for providing a record of the thermal conductance and resistance as a function of time. Thus, it is easy to observe when a steady state condition is obtained by observing the record, and it is also possible to obtain a record of change in thermal conductance with time. This is important, for example, when moisture penetrates the insulating material and changes the thermal conductance. Further, changes in conductance and resistance with time may be observed.

A D.-C. amplifier 72 is connected in place of the meter 19 or 51. The amplifier 72 may be an A.-C. amplifier with means for chopping the input D.-C. signal for amplification and which provides an output to drive the motor 73. The motor 73 is driven in a direction which corresponds to the polarity of the voltage applied to the amplifier and is driven until the voltage applied to the amplifier is reduced to zero. The motor 73 may, for example, drive a pulley 74. An endless belt or cable 75 passes over the pulley 74 and idler pulley 76. The potentiometer tap 49 is attached to the endless belt 75 and is thereby positioned by the rotation of the motor. Pen means 78 are also associated with the endless belt. A chart is driven past the pen by suitable means, such as by a synchronous motor which drives chart rolls. Thus, as the chart moves 79 under the pen, a trace 81 is made of the thermal conductance and resistance. Since the chart moves at a uniform velocity, it may be indexed to give a record of thermal conductance as a function of time.

Thus, it is seen that we have provided portable apparatus for determining thermal conductance of members which includes a thermoelectric heat flow means for generating a voltage which is proportional to heat flow and thermoelectric temperature means for generating a voltage proportional to a temperature difference in a circuit which includes a calibrated variable resistance together with an appropriate balancing means. We have thus provided an instrument which is very useful for field testing and which may be used to determine the thermal conductance of members whose composition or aging characteristics are unknown.

We claim:

1. Apparatus for determining the thermal conductance and resistance of members comprising thermoelectric heat flow means for generating a first voltage proportional to the heat flow through the member, thermoelectric temperature means for generating a second voltage proportional to the temperature difference across the member in the direction of heat flow, and a resistive network connected to receive said voltages and to determine the ratio of the same, said network including a calibrated adjustable resistor and an indicating meter, said calibrated adjustable resistor serving to give a direct indication of the thermal conductance and resistance when it is adjusted for zero indication of the meter.

2. Apparatus as in claim 1 wherein said means for determining the ratio of said voltages comprises a first resistive loop including said first voltage and having at least one variable resistance, a second resistive loop connected to receive said second voltage, temperature compensating means for compensating said voltages for changes in generated voltage with change in ambient temperature, and meter means forming a common leg between said loops whereby adjustment of the said variable resistance causes a zero current flow through the meter, the value of said resistance being proportional to the thermal conductance and resistance.

3. Apparatus as in claim 1 wherein said resistive network comprises a first resistive loop including the thermoelectric heat flow means, a second resistive loop including the thermoelectric temperature means and an adjustable resistance which has an adjustable variable tap, said indicating meter connected between said first loop and said adjustable tap whereby the position of said tap for zero indication of the meter indicates the thermal conductance of the member.

4. Apparatus for determining the thermal conductance and resistance of members comprising thermoelectric heat flow means for generating a first voltage proportional to the heat flow through the member, thermoelectric temperature means for generating a second voltage proportional to the temperature difference across the member in the direction of heat flow, compensating means for compensating said apparatus for changes in generated voltage with changes in ambient temperature, and a resistive network connected to receive said voltages and determine the ratio of the same, said network including a calibrated adjustable resistor, an indicating meter and said compensating means, said calibrated adjustable resistance serving to give a direct indication of the thermal conductance and resistance when it is adjusted for zero reading of the meter.

5. Apparatus as in claim 4 wherein said last-named means includes an amplifier, and motor means, whereby the amplifier supplies driving current to the motor to thereby determine the ratio of said voltages.

6. Apparatus as in claim 5, together with means for providing a continuous record of the thermal conductance and resistance.

7. Apparatus for determining thermal conductance and resistance of members comprising first and second thermoelectric heat flow means each generating a voltage proportional to the heat flow through the same, each of said heat flow means being connected in a resistive loop, thermoelectric temperature means for generating a second voltage proportional to the temperature difference across said member in the direction of heat flow, said temperature means being connected in a third resistive loop, switching means, a meter connecting said switch to said third resistive loop, said switching means serving to connect said first resistive loops individually or in parallel to said meter, and a variable impedance element included in said third loop, said variable impedance element being calibrated to provide direct indication of the thermal conductance and resistance of said member when the variable impedance element is adjusted to establish a zero indication of the meter.

8. Apparatus as in claim 7 together with amplifying means, motor means, said amplifier means serving to provide driving current to the motor, said motor serving to drive the variable element to thereby balance the circuit and give an indication of the ratio of voltages.

9. Apparatus as in claim 8 together with means for providing a continuous record of the thermal conductance and resistance.

10. Apparatus for determining thermal conductance and resistance of members comprising a thermoelectric heat flow means for generating a first voltage proportional to heat flow through the member, thermoelectric temperature means comprising a pair of temperature sensitive devices connected in series opposition and mounted on opposite sides of said member serving to generate a second voltage proportional to the temperature difference across the member in the direction of heat flow, and a resistive network connected to receive said voltages and to determine the ratio of the same, said network including a calibrated adjustable resistor and an indicating meter, said calibrated adjustable resistor serving to give a direct indication of thermal conductance or resistance when the meter is adjusted for zero indication.

11. Apparatus for determining the thermal conductance and resistance of members comprising thermoelectric heat flow means for generating a first voltage proportional to the heat flow through the member, thermoelectric temperature means comprising a pair of temperature sensitive devices connected in series opposition and mounted on opposite sides of said member serving to generate a voltage proportional to the temperature difference across the member in the direction of heat flow, compensating means for compensating said apparatus for changes in generated voltage with changes in ambient temperature, and a resistive network connected to receive said voltages and determine the ratio of the same, said network including a calibrated adjustable resistor, an indicating meter and said compensating means, said calibrated adjustable resistance serving to give a direct indication of the thermal conductance and resistance when it is adjusted for zero reading of the meter.

References Cited in the file of this patent

UNITED STATES PATENTS

| | | |
|---|---|---|
| 2,193,762 | Hirsch et al. | Mar. 12, 1940 |
| 2,484,736 | Razek | Oct. 11, 1949 |
| 2,493,651 | Boelter et al. | Jan. 3, 1950 |
| 2,525,197 | Beams et al. | Oct. 10, 1950 |
| 2,616,296 | Wannamaker | Nov. 4, 1952 |

FOREIGN PATENTS

| | | |
|---|---|---|
| 587,996 | Great Britain | May 12, 1947 |